United States Patent

Yanbin

Patent Number: 5,408,954
Date of Patent: Apr. 25, 1995

[54] DRINKER FOR CHICKEN

[76] Inventor: Ren Yanbin, c/o Wang Hua Kindergarten of Luoyang Cotton, Mill Luoyang, Henan Province 471009, China

[21] Appl. No.: 107,899
[22] Filed: Aug. 18, 1993
[51] Int. Cl.$^6$ .............................................. A01K 7/06
[52] U.S. Cl. ...................................... 119/72.5; 119/75
[58] Field of Search .................... 119/72.5, 75, 72; 251/339

[56] References Cited

U.S. PATENT DOCUMENTS

| | | | |
|---|---|---|---|
| 1,916,513 | 7/1933 | Jones | 119/72.5 |
| 2,469,946 | 5/1949 | Bremer | 119/75 |
| 2,726,636 | 12/1955 | Fredericksen | 119/72.5 |
| 3,357,406 | 12/1967 | Robinson | 119/75 |
| 3,529,575 | 9/1970 | Schalk | 119/72.5 |
| 3,646,955 | 3/1972 | Olde | 119/75 |
| 4,006,716 | 2/1977 | Cross | 119/72.5 |
| 4,538,791 | 9/1985 | Wostal | 119/72.5 |
| 4,790,264 | 12/1988 | Lack et al. | 119/72.5 |
| 4,819,585 | 4/1989 | Dolan et al. | 119/72.5 |
| 4,896,629 | 1/1990 | Johnson | 119/72.5 |

*Primary Examiner*—Paul J. Hirsch
*Attorney, Agent, or Firm*—William F. Pinsak

[57] ABSTRACT

A drinker for chicken has a base, an outer case, a spring casing, a pull rod which is a match for the clearance of the spring casing, and a lever. The pull rod is connected to the combined part of a guideway ringlike valve at an end, and with the spring casing, forms two ringlike clearances within the case. A guide, a washer for the valve and an opening in the base form a clearance, which allows a jet-like spray of water to enter the case. The difference in the sectional areas between the clearances slows the velicity of the water. The time and the volume of water supply can be controlled be adjusting the stroke of the pull rod. By means of a back and forth movement of the guide and the pull rod, creating a jet-like spray, scale (mineral deposits) or any other contamination can be removed from the valve nozzle and the interior of the case. The result is a drinker which has no leakage nor any blockage because of scale build-up, and which is simple in structure and low in cost.

3 Claims, 4 Drawing Sheets

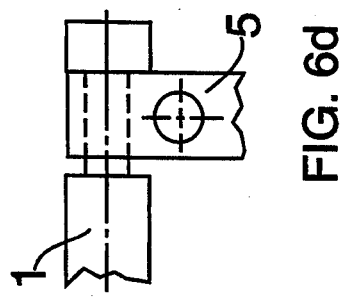
FIG. 6d
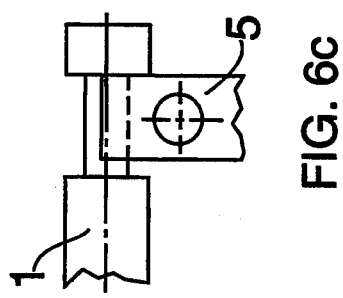
FIG. 6c
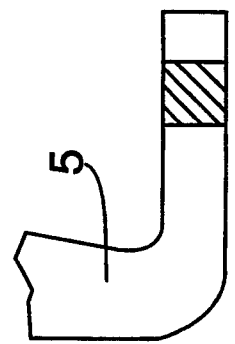
FIG. 7b
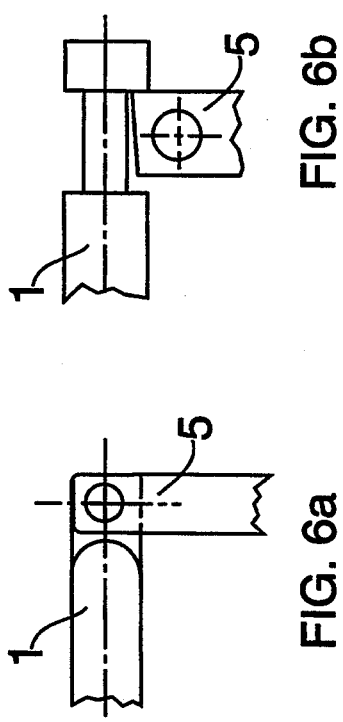
FIG. 6b
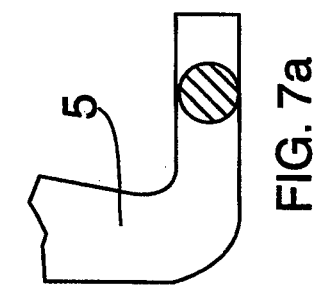
FIG. 7a
FIG. 6a

DRINKER FOR CHICKEN

FIELD OF THE INVENTION

This invention relates to drinking or watering devices for chicken or other birds, and particularly to a drinker for chicken.

BACKGROUND OF THE INVENTION

It is most important to prevent infection or disease in chicken farms. The utilization of drinking devices has generally been successful in the prevention of infection or disease.

Drinking devices should be designed to be leakproof, economic to manufacture, have utility, and not be subject to blockage at a low flow rate of water.

In actual practice, the above-mentioned properties are difficult to realize because scale, which is readily formed by the ions of calcium and magnesium in water, causes drinking devices to be leaky and blocked. For example, the mammillary drinking devices made by American VL Company, or made in Shanghai, both of which are available in China and which have excellent reputations, cannot achieve automatic descaling. Even if scale is not accumulated in these drinking devices, water is leaked from both devices at a rate of approximately one drop every fifteen minutes.

Furthermore, the volume of the water supply cannot be adjusted on the existing drinking devices. Such designs fail to take into consideration and compensate for the unbalanced volume of water supply, which is due to the length of the water pipe and the difference in pressure between the pipe ends.

Soviet Patent SU1586642 and European Patent EP69081 have respectively disclosed drinking devices with flowrate autocontrolling. The device disclosed in EP69081 comprises a pump, a tank and a flexible siphon pipe. The device disclosed in SU1586642 is equipped with a magnetoelectric device and includes a water supplying pipe, a floating rod and a magnet coupled with a magnet plate, etc. Such devices are complicated in structure, but do not avoid scale accumulation in the drinking devices, which results in leakage and eventual blockage.

U.S. Pat. No. 4,896,629 discloses a watering device for poultry comprising a casing, a valve assembly including a valve seat and a valve stem end connecting with a main water pipe, and a sealing member. The end of the valve stem may be pecked by the poultry so as to open the valve, and an elastic element in the valve assembly causes the valve stem and the sealing member to return to a closing position. However, such a valve is also deficient, in that scale is readily accumulated on the valve seat and the seal member, which produces the same problems of leakage and blocking as is encountered by other prior art devices.

Finally, all of the known prior art devices are mounted vertically. Consequently, some drops of water may not enter the chicken's mouth, but will drop to the floor or to the ground when the drinking device is operated.

SUMMARY OF THE INVENTION

The object of this invention is to provide an improved drinking device for chicken having simple structure and which is economical to produce and which solves the problems of leakage and blocking which exist in the prior art devices.

For realizing the objects of the invention, this invention provides a drinker for chicken comprising a case, a valve assembly in communication with a main water supply, a plunger member or pull rod for moving a sealing member of the valve assembly to open and close the valve, and an actuating member for actuating the plunger member or pull rod. The case is sleeved on a base which connects with the main water pipe. The valve assembly comprises the base, a spring casing which connects rigidly with the base at one end and extends toward the inside of the case. There is a hole at the opposite end of the base for the plunger member or pull rod to slide therein.

A spring is provided between an inner end surface of the spring casing at the opposite end and a front flange of the pull rod, the pull rod having a guide at its front end to be inserted into the hole of the base and to slide therein. A first ringlike clearance is formed between the hole of the base and the guide. A sealing member or valve washer is provided on the joint part of the guide and the body of the pull rod to seal the first ringlike clearance.

The plunger member is a multiple staged cylinder, wherein two second ringlike clearances are formed between the front flange and the spring casing. The second ringlike clearances have a cross-sectional area which is greater than that of the first ringlike clearance. The actuating member is an L-shaped lever, one end of which protrudes out of the case and has a concave tongue portion for chicken to peck while drinking. The other end of the lever abuts against a fulcrum of the inner wall of the case by virtue of an elastomer provided on the lever at the opposite side which presses on the case. An extension portion of the pull rod extends beyond the fulcrum and connects with the plunger member or pull rod via a joint so as to open the valve by converting the pecking of the chicken on the tongue portion into an outward motion of the pull rod or to close the valve by the elastic force of the spring.

A drinker for chicken, fabricated in accordance with this invention, has been tested and it has been proven that the drinker can be descaled automatically. Furthermore, there was no leakage, even when the drinker was supplied with water from a tower twenty meters high. The force needed to open the valve can be adjusted so as to meet the need of various chickens. The volume of water supplied can also be adjusted so that chickens may be provided with sufficient amounts of water at different places. The drinker of this invention is simple in structure, economical to produce and is especially suitable for mass production.

It will be understood that, while this invention has been described with reference to chickens, the drinker may be used to supply water to any poultry or fowl, and it is not intended to be limited in any way. By way of example, and not of limitation, it will be understood that there are turkey, pheasant, duck, goose and pigeon farms where such fowl are raised for commercial markets, all of which can utilize the drinker of this invention.

BRIEF DESCRIPTION OF THE DRAWINGS

The present invention is illustrated hereinafter by a detailed description of the preferred embodiment, presented in conjunction with, and by reference to, the accompanying drawings, in which like reference characters refer to like or corresponding parts, and wherein:

FIG. 6($a$–$d$) shows examples of the joint between the pull rod and the L-shaped lever of the drinker according to this invention; and FIG. 7($a$–$b$) is a schematic view showing two kinds of sections of the L-shaped lever of the drinker according to this invention.

DETAILED DESCRIPTION OF THE PREFERRED EMBODIMENT

The preferred embodiment illustrated is not intended to be exhaustive or to limit the invention to the precise form disclosed. It has been chosen and is herein described in order to best explain the invention and its practical use and to enable others skilled in the art to best utilize the invention.

Figure 1:
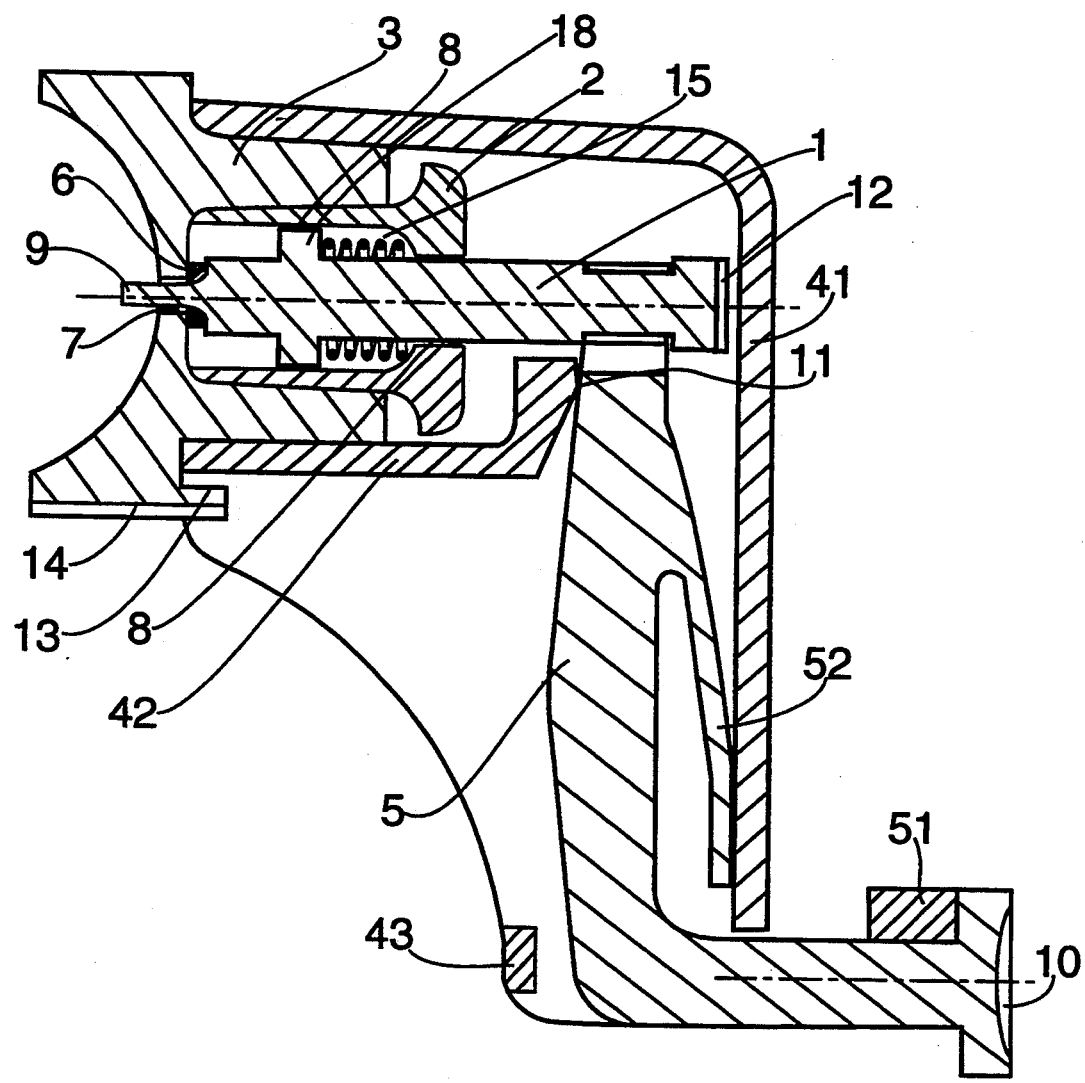
FIG. 1 is a schematic view of the drinker for chicken according to this invention.
Figure 2:
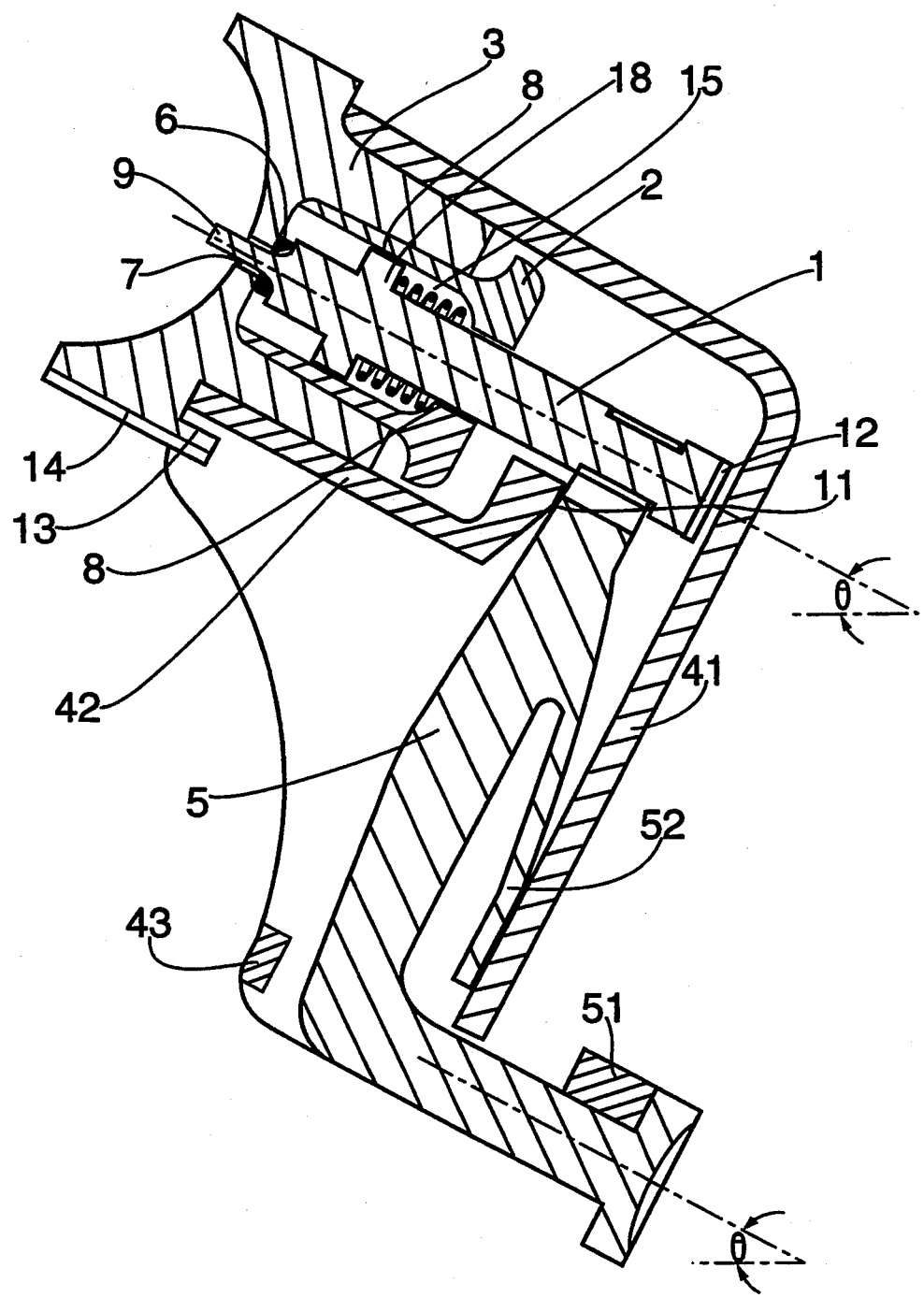
FIG. 2 is a schematic view showing the working state of the drinker for chicken according to this invention.

As shown in FIG. 1, the drinker for chicken according to this invention consists of case 41, 42, pull rod 1, spring casing 2, base 3, lever 5, valve washer 6, cylinder guide 9 formed at the front of pull rod 1, first ringlike clearance 7 formed between guide 9 and a round hole, or opening, at the center of base 3, two second ringlike clearances 8 formed between spring casing 2 and pull rod 1, tongue portion 10, fulcrum 11, a plurality of positioners 51, 43, 12 and pin 13.

Case 41, 42 is sleeved on base 3. Pin 13, protruded from base 3, positions case 41. Guide 9 extends through the opening in base 3 which links the device to the water supply pipe. Valve washer 6 is tightly mounted on the joint part of guide 9 and pull rod 1. Guide 9, washer 6 and the round opening in base 3 form a ringlike valve with guide. Guide 9 and the opening in base 3 form a first ringlike clearance 7, the sectional area of which is one-eighth to one-fortieth of that of second ringlike clearance 8.

Figure 3A:
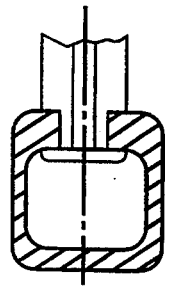
FIG. 3($a$–$c$) shows the joining between the base of the drinker according to this invention and the water supply pipe.
Figure 3B:
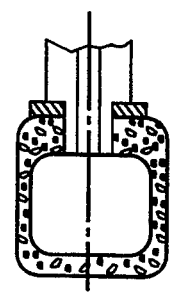
Figure 3C:
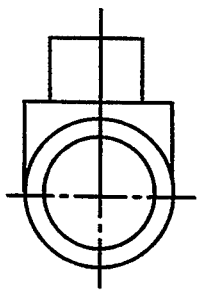

In order to make the structure stable, positioning pin 13 is provided on the joint part of base 3 and case 41. Base 3 is welded, adhered, screwed or spigoted to the water pipe (see FIG. 3), thus simplifying the structure and effecting a good seal.

A spring casing connects rigidly with the base at one end and protrudes toward the inside of case 41, 42. Pull rod 1 and spring 15 are placed between an inner end surface of spring casing 2 and front flange 18 of pull rod 1 within spring casing 2. Pull rod 1 can move back and forth in spring casing 2. The pressure of spring 15 should be a match for the valve opening at tongue portion 10 and the pressure exerted by the water supply.

Pull rod 1 (also referred to as a plunger member), which is a multiple staged cylinder, connects the ringlike valve at one end and is provided with a spacer 12 at he other end. The volume of water supplied can be adjusted by changing either the thickness of the spacer or the length of the pull rod. The details of the manner of adjusting the volume of water are as follows:

Spacer 12 of pull rod 1 is thicker at the upstream portion of a plurality of drinkers, attached in series to the water supply. I. e., the spacers in the drinkers nearer to the main water pipe are the thickest. The spacers of the pull rods of those drinkers in the middle portion of the series are thinner, and there are no spacers provided in those drinkers toward the end of the series. In this manner, a stable volume of water supply $\theta$ can be obtained, although the pressure in the pipe decreases progressively from the upstream end to the downstream end.

Volume of water supply $\theta$ may be calculated according to the following formula: $\theta = AVt$, where A is the watering area of the ringlike clearance 7 and is, for purposes of the formula, a constant. V is the velocity of the water, which decreases progressively with the change of water pressure. That is to say, the velocity of water in the drinker at the upstream end of the series is greater than the velocity of water in the drinker at the downstream end of the series, or, $V_{up} > V_{do}$.

"t" is the time for supplying water, so only when the time for supplying water at an upstream drinker is smaller than that at a downstream drinker, i.e., $t_{up} < t_{do}$, the volume of water supply $\theta$ remains stable.

The purpose of changing the length of the stroke of the pull rod is for changing the time for supplying water to cause it to increase gradually from the upstream to the downstream. At the same time, the distances between washers 6 and the bottoms of bases 3 are widened gradually from drinker to drinker with the increase of the stroke. Thus, the flow resistance decreases and the volume of flow becomes greater. The spacer is merely a positioner. In a similar fashion, a stable volume of water supply can be obtained merely by changing the length of pull rod 1, or simply by thickening positioners 51 or 43.

L-shaped lever 5, which may have various shapes in cross-section, such as circular (FIG. 7($a$)) or square (FIG. 7($b$)), is connected to pull rod 1 through a joint on its top end, and has a concave tongue portion 10 on its other end. The concave surface can converge water and light to attract the chicken to drink the water. An elastomer 52 is provided on lever 5 at the opposite side of fulcrum 11 to press lever 5 against fulcrum 11 in order to avoid any idle motion.

The ringlike valve with guide consists of pull rod 1 and guide 9, which are integrated with each other, and washer 6, which is illustrated in FIG. 1 as having a round cross-section. A portion of guide extends through the opening in base 3, in order that washer 6 can seal the valve against leakage. A variety of ringlike valves with guides are depicted in the drawings. Washer 6 is made of any standard material which is used for washers serving similar purposes, and may be an O-ring (FIG. 5($a$)), a hemicycle sectioned ring (FIG. 5($b$)), a truncated conical ring (FIG. 5($c$)) or a cylindrical ring (FIG. 5($d$)).

Figure 4:
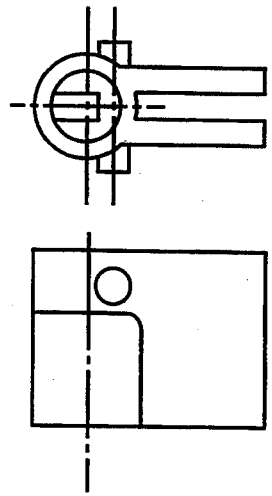
FIG. 4 is another embodiment of the case of the drinker according to this invention.
Figure 5A:
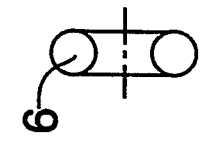
FIG. 5($a$–$d$) shows examples of the valve washer of the drinker according to this invention.
Figure 5B:
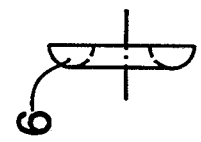
Figure 5C:
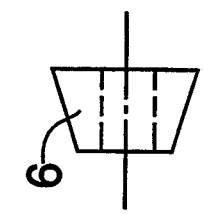
Figure 5D:
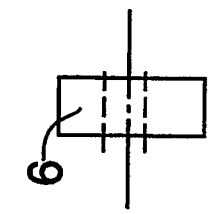

There many forms of the fulcrum 10 and the case 41, 42, as illustrated in the drawings. As depicted in FIG. 4, fulcrum 10 has a pivotal structure.

Examples of a variety of ways in which pull rod 1 and lever 5 may be joined are illustrated in FIG. 6. Illustrated are a pivot joint (FIG. 6($a$)), a protrusion-slot joint (FIG. 6($b$)), a fork joint (FIG. 6($c$)) or a circular head joint (FIG. 6($d$)) enclosing a part of the pull rod. It will be noted that the circular head joint is also that which is depicted in FIG. 1, and for a variety of reasons, this is the preferred embodiment.

According to the invention, clearances 8 are designed to be larger than clearance 7, in order to decrease the velocity of the water and to permit it to converge by gravity to the tongue portion, from whence it flows to the thirsting chicken.

The operation and working process of the drinker may be summarized in the following manner: When a thirsty chicken pecks at tongue portion 10 of the drinker, the vertical arm of lever 5 pushes pull rod 1 rearwardly to close the clearance between spacer 12 and case 41 by means of the pivotal movement about fulcrum 11. Thusly, the valve is opened, water is jetted through clearance 7 to spring casing 2, and then passes clearances 8, at which point the water pressure is decreased. The water then flows out of spring casing 2 and converges to concave tongue portion 10 via the inner wall of case 41, 42 and lever 5, dropping into the mouth of the waiting bird.

Because the drinker is mounted at an inclination, i.e., the axis of pull rod 1 and the axis of tongue portion 10 are inclined to the horizontal, all of the water will flow down to the chicken while its mouth remains open. When tongue portion 10 is released, the pressure of the spring resets pull rod 1 and causes washer 6 to close and seal the valve. Thus completes one cycle of water supply.

In the preferred embodiment of the drinker for chicken, made in accordance with this invention, the spring is made of stainless steel, the washer is made of rubber, and the other parts are made of plastic with specified strength, hardness and resistance to impact. Injection molding is the preferred technique for production.

Although the invention has been described and illustrated in detail, it is to be clearly understood that the same is intended by way of illustration and example only and is not to be taken by way of limitation. The spirit and scope of the invention are to be limited only by the terms of the appended claims.

I claim:

1. A drinker for chicken comprising a case, a valve assembly connecting with a main water pipe, a plunger member or pull rod for moving a sealing member of the valve assembly to open and close the valve, and an actuating member for actuating said plunger member or pull rod, wherein said case is sleeved on a base which connects with the main water pipe;

said valve assembly comprising the base, a spring casing which connects rigidly with the base at one end and protrudes toward the inside of the said case, said base having an opening at the opposite end thereof for the plunger member or pull rod to slide therein, a spring being provided between an inner end surface of the spring casing at the opposite end and a front flange of the pull rod, the pull rod having a guide at its front end to be inserted into the opening in the base and to slide therein, a first ringlike clearance being formed between the opening of the base and the guide, a sealing member or valve washer being provided on the joint part of the guide and the body of the pull rod to seal the first ringlike clearance;

said pull rod being a multiple staged cylinder, two second ringlike clearances being formed between the front flange and the spring casing, said second ringlike clearances having a coss-sectional area which is greater than that of the first ringlike clearance;

said actuating member being an L-shaped lever, one end of which protrudes out of the case and has a concave tongue portion for chicken to peck while drinking, and the other end of which abuts against a fulcrum of the inner wall of the case by an elastomer provided on the lever at the opposite side and which presses against said case, an extension portion of the pull rod extending beyond the fulcrum and connecting with the plunger member or pull rod via a joint so as to open the valve by converting the pecking by the chicken on the tongue portion into an outward motion of the pull rod or to close the valve by the elastic force of the spring.

2. The drinker for chicken according to claim 1, wherein said valve washer is an O-ring.

3. the drinker for chicken according to claim 1, wherein the axis of said pull rod and the axis of said tongue portion are inclined with respect to the horizontal.

* * * * *